United States Patent [19]

Gorman et al.

[11] Patent Number: 5,320,300
[45] Date of Patent: Jun. 14, 1994

[54] SELF-THREADING TAKE-UP MAGAZINE

[75] Inventors: Harry A. Gorman; Robert J. Blackman, both of Rochester, N.Y.

[73] Assignee: Eastman Kodak Company, Rochester, N.Y.

[21] Appl. No.: 55,179

[22] Filed: Apr. 29, 1993

[51] Int. Cl.$^5$ .................................................. G03B 17/26
[52] U.S. Cl. .................................................. 242/71.1
[58] Field of Search ................. 242/71.1, 71, 74, 74.1, 242/76; 354/275

[56] References Cited

U.S. PATENT DOCUMENTS

| | | |
|---|---|---|
| 2,578,283 | 12/1951 | Bornemann et al. |
| 3,383,068 | 5/1968 | Winkler et al. ............... 242/71.1 |
| 4,060,210 | 11/1977 | Norris ............................ 242/71.1 |
| 4,111,379 | 9/1978 | Luscher .......................... 242/71.1 |
| 4,136,839 | 1/1979 | Walter ............................ 242/71.1 |
| 4,166,588 | 9/1979 | Krehbiel et al. ............ 242/67.1 R |
| 4,504,026 | 3/1985 | Serizawa et al. ............. 242/71.1 |
| 4,853,742 | 8/1989 | Payrhammer et al. ............. 355/27 |

*Primary Examiner*—John M. Jillions
*Attorney, Agent, or Firm*—Roger A. Fields

[57] ABSTRACT

A self-threading take-up magazine for a strip material comprises a magazine casing having an interior chamber, a winding core rotatable within the interior chamber to wind the strip material onto the core, and guide means for directing the strip material along the interior chamber towards the winding core to permit the strip material to be threaded to the core. According to the invention, the magazine casing has a web guide portion which is moveably connected to a remaining portion of the magazine casing for opening movement into the interior chamber to extend to the winding core to constitute the guide means and for closing movement out of the interior chamber away from the winding core to make room for the strip material to be wound onto the core.

6 Claims, 2 Drawing Sheets

SELF-THREADING TAKE-UP MAGAZINE

BACKGROUND OF THE INVENTION

1. Field of the Invention

The invention relates generally to the field of magazines or cartridges, and in particular to self-threading take-up magazines for flexible strip materials.

2. Description of the Prior Art

Self-threading take-up magazines for strip materials are generally well known. Typically, as disclosed in U.S. Pat. No. 2,578,283, issued Dec. 11, 1951, , and U.S. Pat. No. 4,060,210, issued Nov. 29, 1977, a self-threading take-up magazine comprises a magazine casing having an interior chamber, a winding core or hub rotatable within the interior chamber to wind the strip material onto the core, and guide means for directing a leading end of the strip material along the interior chamber to the winding core to permit the strip material to be threaded to the core. The guide means is pivotally mounted within the interior chamber for movement away from the winding core by the increasing diameter of the strip roll as the strip material is wound onto the core.

Problem to be Solved by the Invention

In the prior art magazines such as disclosed in U.S. Pat. Nos. 2,578,283 and 4,060,210 the guide means rests against the outermost convolution of the strip roll as the strip material is wound onto the winding core. This disadvantageously may cause the formation of pressure marks along the strip material.

Also, the guide means is an additional part to be pivotally mounted within the interior chamber of the magazine housing.

SUMMARY OF THE INVENTION

According to the invention, a self-threading take-up magazine for a strip material comprising a magazine casing having an interior chamber, a winding core rotatable within the interior chamber to wind the strip material onto the core, and guide means for directing the strip material along the interior chamber towards the winding core to permit the strip material to be threaded to the core, is characterized in that:

the magazine casing has a web guide portion which is moveably connected to a remaining portion of the magazine casing for opening movement into the interior chamber to extend to the winding core to constitute the guide means and for closing movement out of the interior chamber away from the winding core to make room for the strip material to be wound onto the core.

Advantageous Effects of the Invention

Since the guide means does not rest against the outermost convolution of the strip roll as the strip material is wound onto the winding core, there will be no formation of pressure marks along the strip material.

Also, the guide means is an integral part of the magazine housing rather than a separate part.

DETAILED DESCRIPTION OF THE PREFERRED EMBODIMENT

Figure 2:
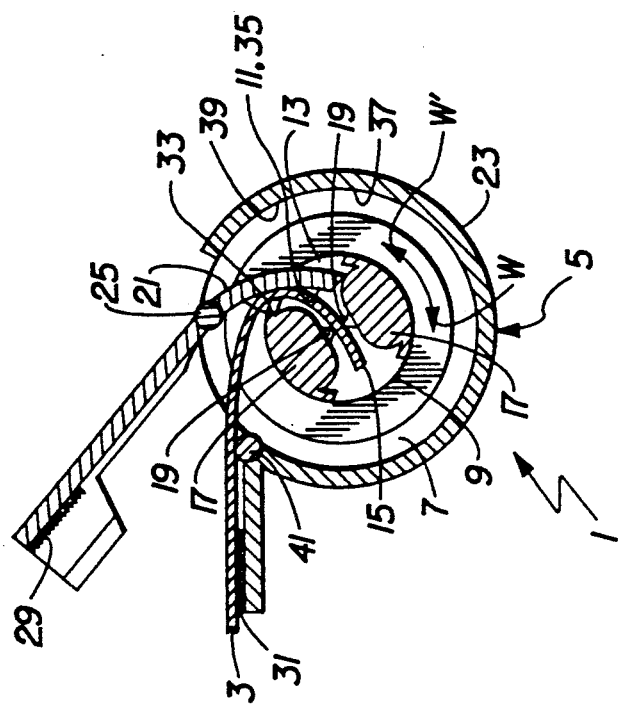
FIG. 2 is a side section view of the magazine as depicted in FIG. 1, showing how a leading end of the strip material is threaded to an interior winding core.

The invention is disclosed as being embodied preferably in a self-threading take-up magazine for a strip material. Because the features of such a magazine are generally known, the description which follows is directed in particular only to elements forming part of or cooperating directly with the disclosed embodiment. It is to be understood, however, that other elements may take various forms known to a person of ordinary skill in the art.

Referring now to the drawings, FIGS. 1–5 show a self-threading take-up magazine 1 for a flexible strip material 3, such as photographic film. The take-up magazine 1 comprises a magazine casing 5 having an interior chamber 7, a winding core or hub 9 rotatable in opposite directions W and W' within the interior chamber to wind the strip material onto the core, and guide means 11 for directing the strip material along the interior chamber to the winding core to permit the strip material to be threaded to the core.

Figure 4:
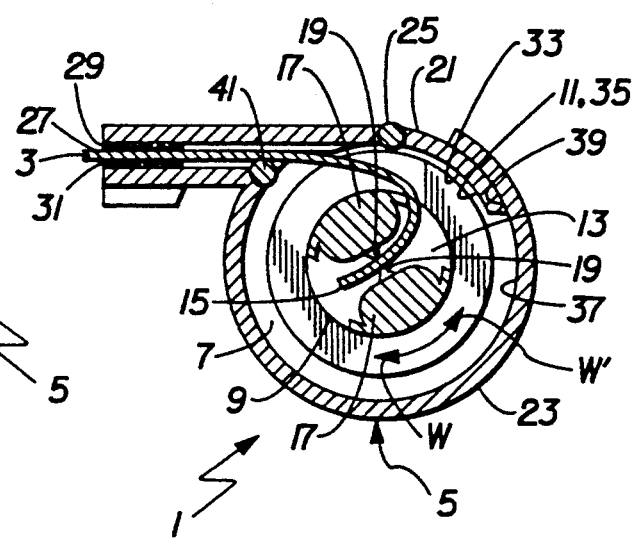
FIG. 4 is a side section view of the magazine as depicted in FIG. 3, showing the winding core rotated in one direction to take-up the strip material.
Figure 5:
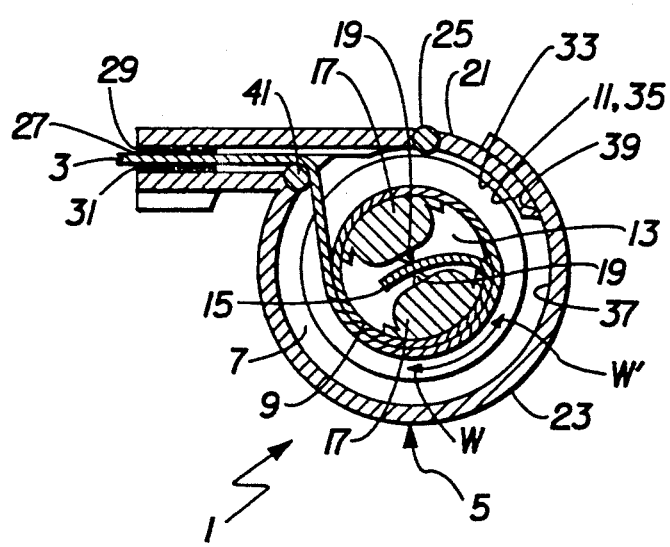
FIG. 5 is side section view similar to FIG. 4, showing the winding core rotated in a reverse direction to take-up the strip material.

The winding core 9 as shown in FIG. 4 has a slot 13 dimensioned to receive a leading end 15 of the strip material 3. A pair of identical protuberances 17, 17 project inwardly from the winding core 9 into the slot 13 in opposing relationship. The respective protuberances 17, 17 have molded gripper teeth 19, 19 which face each other to secure the leading end 15 of the strip material 3 to the winding core 9 when the leading end is advanced into the slot 13 and between the gripper teeth.

Figure 1:
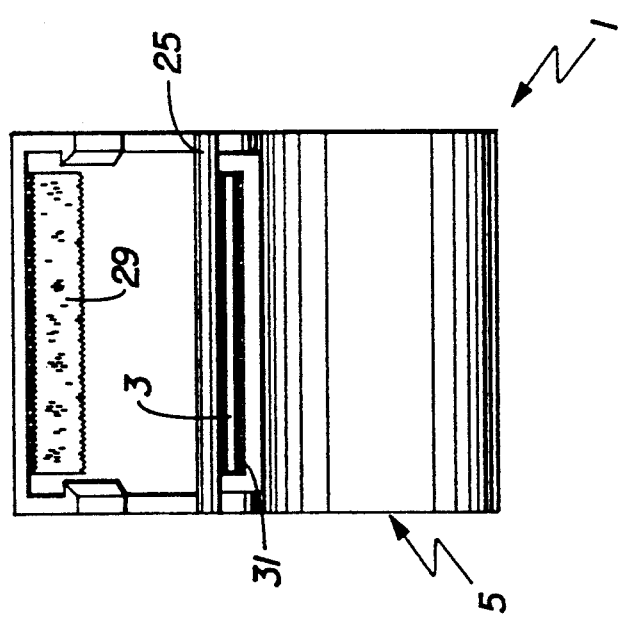
FIG. 1 is a front elevation view of a self-threading take-up magazine for a strip material according to preferred embodiment of the invention, showing the magazine opened to receive the strip material.
Figure 3:
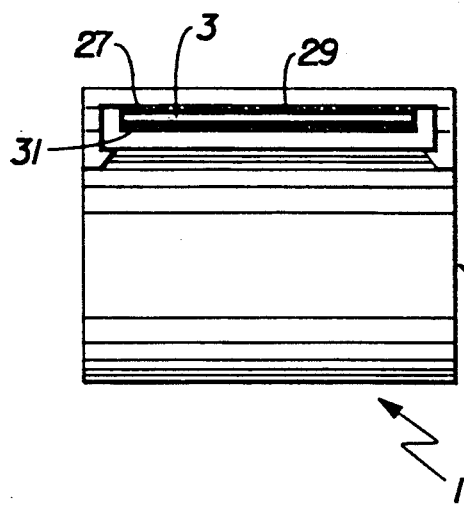
FIG. 3 is a front elevation view of the magazine, showing the magazine closed to wind the strip material onto the interior winding core.

The magazine casing 3 consists of two pieces, a web guide portion 21 and a remaining or main portion 23. The web guide portion 21 is pivotally connected to the remaining portion 23 via a hinge 25 to permit opening movement of the web guide portion to an opened position shown in FIGS. 1 and 2 and to permit closing movement of the web guide portion to a closed position shown in FIGS. 3–5. The web guide portion 21 and the remaining portion 23 together define a passageway 27 for the strip material 3 into the interior chamber 7 when the web guide portion is pivoted to its closed position. As shown in FIGS. 1 and 2, the passageway 27 is substantially, i.e. fully, opened when the web guide portion 21 is pivoted to its opened position. Respective light-trapping plush or velvet pads 29 and 31 are adhered to the web guide portion 21 and to the remaining portion 23 for abutting each other to make the passageway 27 light-tight when the web guide portion is pivoted to its closed position shown in FIGS. 1 and 2. The light-trapping pads 29 and 31 separate from each other when the web guide portion 21 is pivoted to its opened position shown in FIGS. 3–5.

The web guide portion 21 of the magazine casing 3 has a curved wall segment 33 which, along its inner side 35, defines the guide means 11. As shown in FIG. 2, when the web guide portion 21 is pivoted to its opened position the curved wall segment 33 is lowered into the interior chamber 7 to cause the guide means 11 to protrude slightly into the slot 13. This permits the leading end 15 of the strip material 3 to be threaded along the inner side 35 into the slot 13 and between the gripper teeth 19, 19 to secure the leading end to the winding core 9. The curved wall segment 33 conforms to the curvature of a curved wall segment 37 of the remaining portion 23 of the magazine casing 3. As shown in FIG. 4, when the web guide portion 21 is pivoted to its closed position the curved wall segment 33 is raised from the interior chamber 7 out of the way of the strip material 3 to come to rest against an inner side 39 of the curved wall segment 37.

When the leading end 15 of the strip material 3 is secured to the winding core 9, the strip material can be wound onto the winding core by rotating the core in the direction W shown in FIG. 4. Alternatively, the strip material 3 can be wound onto the winding core 9 by rotating the core in the winding direction W' shown in FIG. 5. A pair of opposing rounded edge guides 41 (only one shown) are located at one end of the inner side 39 of the remaining portion 23 of the magazine casing 3, immediately inward of the passageway 27, to support the strip material 3 along its respective longitudinal edges when the strip material is wound onto the winding core 9 by rotating the core in the winding direction W'. The edge guides 41 prevent one of the faces of the strip material between its longitudinal edges from rubbing against the one end of the inner side 39 that is immediately inward of the passageway 27.

The invention has been described with reference to a preferred embodiment. However, it will be appreciated that variations and modifications can be effected by a person of ordinary skill in the art without departing from the scope of the invention.

Parts List for FIGS. 1-5

1. magazine housing
3. strip material
5. magazine casing
7. interior chamber
9. winding core
W & W'. winding directions
11. guide means
13. slot
15. leading strip end
17, 17. protuberances
19, 19. gripper teeth
21. web guide portion
23. remaining portion
25. hinge
27. passageway
29 & 31. light-trapping pads
33. curved wall segment
35. inner side
37. curved wall segment
39. inner side
41. edge guides

We claim:

1. A self-threading take-up magazine for a strip material comprising a magazine casing having an interior chamber, a winding core rotatable within said interior chamber to wind the strip material onto said core, and guide means for directing the strip material along said interior chamber towards said winding core to permit the strip material to be threaded to the core, is characterized in that:

said magazine casing has a web guide portion, including said guide means, which is pivotally connected to a remaining portion of the magazine casing for opening movement into said interior chamber to an opened position pointing the guide means towards said winding core to permit the strip material to be threaded to the core and for closing movement out of the interior chamber to a closed position pointing the guide means away from said winding core to make room for the strip material to be wound onto the core; and said web guide portion and said remaining portion of the magazine casing together define a passageway for the strip material into said interior chamber when the web guide portion is pivoted to its closed position but which is opened substantially when the web guide portion is pivoted to its opened position.

2. A self-threading take-up magazine for a strip material as recited in claim 1, wherein said guide means and said web guide portion of the magazine casing are integrally formed.

3. A self-threading take-up magazine for a strip material as recited in claim 1, wherein said winding core has a slot adapted to receive a leading end of the strip material to secure the strip material to the core, and said guide means is shaped to partly enter said slot to permit the strip material to be threaded into the slot when said web guide portion of the magazine casing is pivoted to its opened position.

4. A self-threading take-up magazine for a strip material as recited in claim 1, wherein respective light-trapping means are connected to said web guide portion and said remaining portion of the magazine casing for cooperation to make said passageway light-tight when the web guide portion is pivoted to its closed position and to separate when the web guide portion is pivoted to its opened position.

5. A self-threading take-up magazine for a strip material as recited in claim 1, wherein said remaining portion of the magazine casing includes a curved wall which partly surrounds said interior chamber, and said web guide portion of the magazine casing includes a curved wall which extends to said winding core to constitute said guide means when the web guide portion is pivoted to its opened position and which conforms to the curvature of said curved wall of the remaining portion to rest against the latter wall when the web guide portion is pivoted to its closed position.

6. A self-threading take-up magazine for a strip material as recited in claim 1, wherein said web guide portion of the magazine casing extends to said winding core to constitute said guide means when the web guide portion is pivoted to its opened position.

* * * * *